(12) United States Patent
Randolph

(10) Patent No.: US 6,359,410 B1
(45) Date of Patent: Mar. 19, 2002

(54) APPARATUS AND METHOD FOR MOTOR CURRENT PROTECTION THROUGH A MOTOR CONTROLLER

(75) Inventor: Bruce Randolph, Springfield, TN (US)

(73) Assignee: CEI Co., Ltd., Springfield, TN (US)

( * ) Notice: Subject to any disclaimer, the term of this patent is extended or adjusted under 35 U.S.C. 154(b) by 0 days.

(21) Appl. No.: 09/510,548

(22) Filed: Feb. 22, 2000

(51) Int. Cl.⁷ ................................................ G05B 11/28
(52) U.S. Cl. .................... 318/599; 318/432; 318/434; 318/807; 318/808; 318/811; 318/812
(58) Field of Search ................................ 318/599, 432, 318/434, 807, 808, 811, 812

(56) References Cited

U.S. PATENT DOCUMENTS

| | | |
|---|---|---|
| 4,797,600 A | 1/1989 | Savage et al. |
| 4,893,067 A | 1/1990 | Bhagwat et al. |
| 5,109,186 A | 4/1992 | Lieu |
| 5,125,067 A | 6/1992 | Erdman |
| 5,227,704 A | 7/1993 | Erdman |
| 5,270,898 A * | 12/1993 | Elms et al. ................. 364/483 |
| 5,376,866 A | 12/1994 | Erdman |
| 5,388,176 A | 2/1995 | Dykstra et al. |
| 5,414,792 A | 5/1995 | Shorey |
| 5,528,485 A | 6/1996 | Devilbiss et al. |
| 5,648,716 A | 7/1997 | Devilbiss et al. |
| 5,754,732 A | 5/1998 | Vlahu |
| 5,953,681 A * | 9/1999 | Cantatore et al. ........... 318/599 |
| 6,091,201 A * | 7/2000 | Walsh et al. ................. 318/599 |

* cited by examiner

Primary Examiner—Karen Masih
(74) Attorney, Agent, or Firm—Waddey & Patterson; David B. Pieper

(57) ABSTRACT

The present invention provides a new limiting signal circuit configuration for the connection of a pulse-width modulation motor controller integrated circuit. This new circuit allows for increased control over the over-current protection scheme while increasing the maximum available current levels. The invention utilizes a resistor based voltage divider connected to an input power source to provide a sliding scale current limiting signal in proportion to the input voltage. This method provides protection in relationship to the incoming power signal.

17 Claims, 4 Drawing Sheets

APPARATUS AND METHOD FOR MOTOR CURRENT PROTECTION THROUGH A MOTOR CONTROLLER

BACKGROUND OF THE INVENTION

The present invention is directed to an apparatus and method for improved current protection for an electrical controller. More particularly, the invention is directed for use in pulse width modulation controllers that use a power-limiting signal as a comparative base for determining power overload conditions for the device being controlled. These circuits are used to control various types of motors, including fan blower motors and fuel pumps in automobiles.

As shown in FIG. 1 of the drawings, a typical application diagram for a pulse-width modulation motor controller is generally shown by the reference numeral 10. The pulse-width modulation motor controller integrated circuit chip 12 shown in the drawing is the heart of the pulse width modulation motor controller circuit 10. This integrated circuit chip 12 is sold by DELCO ELECTRONICS CORPORATION of Kocomo, Indiana, United States of America as Part No. 16214712, IC-Bi-Polar: PMDH—Pulse-Width Modulation High Side Motor Control IC and is sold in a standard 16 pin package.

The pins of this integrated circuit 12 allow for power inputs and control signals to enter and leave the circuit 12 and supply the controlling signals for powering the MOSFET 14 that adjusts the power flow to the motor or device being controlled. The first pin is a drive output power pin 16 that provides a pulse-width modulation signal to a resistor network 18. The resistor network 18 drives the gate of the N-channel logic level power MOSFET 14 to control the motor. The second pin is a boost pin 20 that provides an increased positive voltage supply for the integrated circuit chip's 12 output drive circuitry. This increased voltage supply is generated by an external voltage boosting circuit that includes an inductor 22 and capacitor 24 circuit that is connected to the battery or power supply 26.

The third pin is the default retry capacitor pin 28 that acts as an input and output pin for charging and discharging a capacitor 30. If the capacitor charging occurs faster than the discharging, an internal comparator to the chip 12 trips which disables the drive signal on the drive output power pin 16. This continues until the capacitor 30 discharges. This discharge time gives the MOSFET 14 time to cool down.

The resistor isolation pin 32 and capacitor isolation pin 34 allow for the connection of a resistor 36 and capacitor 38 to control the frequency at which the pulse-width modulation integrated chip 12 will operate.

The control input signal pin 40 inputs a voltage signal between 0 and 5 volts that is generated by a voltage control circuit 42 to directly control the motor speed. If the voltage at the control input signal pin 40 is less than 10% of the value of the regulated voltage at output pin 30, then the integrated circuit 12 will enter a quiescent mode. This quiescent mode helps to limit the ignition-off current draw in automobile applications. The positive ground pin 44 allows for a high current ground to discharge current from the integrated circuit chip 12.

The input voltage pin 46 is also known as the VCC power pin 46. This is the input pin for the positive voltage supply for the integrated circuit chip 12. The normal operating range for integrated circuit chip 12 input voltage is between 7 and 18 volts, however, voltages from −0.3 volts to 30 volts are acceptable. The voltage regulator pin 48 uses a standard band-gap regulator to provide a stable 5 volt output that is used internally for the chip 12 and is also made available externally through the voltage regulation pin 48.

The inductor sense pin 50 is used to monitor the current through the external boost inductor 22 in order to limit the current for each pulse of the pulse width modulation signal. The charge pump capacitor pin 52 uses the external capacitor 24 to create a boost voltage above the normal supply voltage.

The sensor negative pin 54 and sensor positive pin 56 are used to monitor the voltage across a device or motor power-sensing resistor 58. These pins read a voltage corresponding to the current flow through the motor or other device being driven by the circuit 10. The current adjustment signal pin 60 is used to read in a voltage from a voltage divider 62. This voltage divider 62 is formed from a first resistor 64 and second resistor 66. The voltage divider 62 provides a voltage signal to the current adjustment signal pin 60 that is used as basis for comparison against the input of the sensor input negative pin 36 and sensor input positive pin 38. This comparison is used to control the power flow through the MOSFET 14. If the voltage of the current adjustment pin 60 is greater than the voltage across the sensor negative pin 54 and sensor positive pin 56, then the power to the MOSFET 14 is allowed to flow in an unrestricted manner from the drive pin 16. However, when the voltage across the sensor negative pin 54 and sensor positive pin 56 exceeds the voltage on the current adjustment pin 60, the power to the MOSFET 14 is restricted or turned off. This controls the power flow to the motor or other driven device and limits the current flow to the device or motor.

The inhibit sensor pin 68 allows for either a temperature or resistor-type configuration to provide a control signal to shut down of the MOSFET 14. The inhibit sensor pin 68 may be used as a general purpose inhibit pin. Finally, the ground signal pin 70 is used as a return ground. The ground signal pin 70 is connected to the original power source ground 72.

The primary function of this integrated circuit chip 12 and circuit 10 is to control the speed of a DC brush motor by driving the gate of an N-channel enhancement mode power MOSFET 14 with a pulse-width modulation signal through resistor network 18 in a hi-side drive configuration.

FIG. 2 of the drawings is a subset schematic of the application diagram of FIG. 1. As shown in FIG. 2 of the drawings, the prior art design teaches the connection of the current adjustment signal pin 60 through a voltage divider 62 that is powered by the voltage regulator pin 48. The voltage diver 62 is formed from first resistor 64 and a second resistor 66 joined a connection point 68. Because the voltage regulator pin 48 supplies a constant voltage power supply to the voltage divider 62, the current adjustment signal pin 60 is maintained at a constant voltage level that is a percentage of the voltage supplied by the voltage regulation pin 48 output.

This prior art system suffers from several disadvantages including the inefficient use of a voltage protection circuit, the inefficient use of available voltage information, and a reduction of the available power for the motor circuitry. The inefficiencies of the operation of this circuitry are easily understood by reviewing the operating characteristics of this circuit.

FIG. 4 of the drawing shows the relationship between an input voltage VCC and an output voltage of the regulator VREG. As shown by FIG. 4 of the drawings, for different VCC the VREG remains a consistent voltage level. Because the prior art teaches a circuit for deriving the voltage limiting signal, as shown by line VLIM, from the constant voltage signal VREG, the voltage limiting signal will also remain at a constant voltage level that is independent of the input voltage VCC.

FIG. 5 of the drawings shows the voltage limiting signal VLIM of FIG. 4, and adds the maximum power signal VMAX that shows the relationship of the maximum available power output for the motor circuitry. As the maximum power signal VMAX available to the motor increases, the output approaches the protection level VLIM. As noted by the voltage limiting signal VLIM shown in this chart, the voltage limiting signal VLIM is constant and independent of the maximum available power output VMAX for the operation of the motor. Thus by maintaining the voltage limiting signal VLIM at a consistent level, area 80 is developed that shows the difference between the maximum power signal VMAX and the voltage limiting signal VLIM. Area 80 represents the inefficiency associated with the prior art circuit 10 for the proper protection of the motor output. Thus, as shown in FIG. 5, the voltage limiting signal VLIM does not have a close relationship to the maximum power output signal for the motor. This results in a large gap 80 between the voltage limiting signal VLIM and the maximum power signal VMAX. The gap 80 results in a loss of motor protection at the lower power signal levels. Thus, this system allows for a large signal difference to occur before the voltage limiting signal VLIM will control the overload to the motor.

Additional motor controlling systems are described in U.S Pat. No. 4,797,600 issued to Savage et al.; U.S. Pat. No. 4,893,067, issued to Bhagwat et al.; U.S. Pat. No. 5,109,186, issued to Lieu; U.S. Pat. No. 5,125,067, issued to Erdman; U.S. Pat. No. 5,227,704, issued to Erdman; U.S. Pat. No. 5,376,866, issued to Erdman; U.S. Pat. No. 5,388,176, issued to Dykstra et al.; U.S. Pat. No. 5,414,792, issued to Shorey; U.S. Pat. No. 5,528,485, issued to Devilbiss et al.; U.S. Pat. No. 5,648,716, issued to Devilbiss et al.; and U.S. Pat. No. 5,754,732, issued to Vlahu. Each of the patents is outlined in the following discussion and is hereby incorporated by reference.

U.S. Pat. No. 4,797,600, issued to Savage et al. on Jan. 10, 1989, discloses a Magnetic Drive Control System for a Multiple Cooling Fan Installation. This patent specification described a pulse-width modulation input proportional to the command speed. When excess of current is detected, the output of the circuit is toggled to intermittently interrupt the energization of the motor phase windings in the presence of persistent over-current conditions.

U.S. Pat. No. 4,893,067, issued to Bhagwat et al. on Jan. 9, 1990, discloses a Direct Current Motor Speed Control. This specification teaches a system to monitor the motor speed using the back EMF as a measure of motor speed. This back EMF signal is monitored to generate an error signal to correct the desired speed of the controlling transistor and the motor speed.

U.S. Pat. No. 5,109,186, issued to Lieu on Apr. 28, 1992, discloses a Pulse Width Modulated Step-Down MOSFET Regulator. This patent specification teaches the use of a pulse-width modulation integrated circuit in a DC to DC regulated step-down switching circuit.

U.S. Pat. No. 5,125,067, issued to Erdman on Jun. 23, 1992, discloses a Motor Controls, Refrigeration Systems and Method of Motor Operation and Control. The disclosure of this patent specification is repeated in U.S. Pat. Nos. 5,227,704 and 5,376,866. These specifications teach a duty cycle generator which produces a speed control signal for a electrically commutated motor driven compressor. The system includes a resistor and zener diode to provide to over-voltage protection for the solid state components.

U.S. Pat. No. 5,388,176, issued to Dykstra et al. on Feb. 7, 1995, discloses a DC Motor Speed Control System. This patent teaches the use of a pulse-width modulation DC motor controller. This PWM controller has a current limiter and overload indicators. This system teaches an overload indicator which allows the operator to reduce the load and conserve the energy of the DC power supply. The system increases a reference voltage to allow for the maximum current limit to be increased during high load conditions.

U.S. Pat. No. 5,414,792, issued to Shorey on May 9, 1995, discloses an Electric Throttle and Motor Control Circuitry. This specification describes a pulse-width modulation circuit which uses MOSFET devices to control the power directed to the motor. The system uses an op-amp (186) to control a current limiting feature of this invention.

U.S. Pat. No. 5,528,485, issued to Devilbiss et al. on Jun. 18, 1996, discloses a Power Control Circuit for Improved Power Application and Control. This patent specification teaches over-voltage sensing to protect the DC load. If the voltage reaches a critical predetermined voltage then the protection circuit will trip and provide a short circuit across the DC load. A similar discussion is found in U.S. Pat. No. 5,648,716, issued to Devilbiss et al, entitled Power Control Circuit for a Battery Charger.

U.S. Pat. No. 5,754,732, issued to Vlahu on May 19, 1998, discloses a Distributed Power Supply for High Frequency PWM Motor Controller with IGBT Switching Transistors. Current sensors are provided to sense the current flow through the motor windings to provide voltage feedback signals. These signals are compared against desired excitation signals to control the pulse width modulation signal.

Thus, the prior art teaches a consistent voltage-limiting signal in order to control the output available to a direct current motor over a range of input voltages. Therefore, an improved voltage regulation circuit that allows for a varying voltage limiting signal is needed.

SUMMARY OF THE INVENTION

The present invention provides a new variable limiting signal circuit configuration for the connection of a pulse-width modulation motor controller integrated circuit. This new circuit allows for increased control for the over-current protection scheme. The invention utilizes a resistor based voltage divider connected to a variable input voltage source to provide a sliding scale current limiting signal. This method provides protection in relationship to the incoming variable input voltage signal.

In accordance with one embodiment of the present invention, an over-current protection circuit for a pulse-width modulation motor controller is provided comprising a variable input voltage signal, a ground signal, a pulse-width modulation motor control signal, a motor current signal, a current adjustment signal which sets a limit for the motor current signal, an integrated circuit chip which selectively outputs a pulse-width modulation motor control signal in proportion to the variable input voltage signal, ground signal, current adjustment signal, and motor current signal, a first resistor, and a second resistor, where the first resistor and second resistor control the current adjustment signal in proportional relationship to the variable input voltage signal.

In accordance with another example of the present invention, the unit uses the integrated circuit chip to clip the pulse-width modulation motor control signal whenever the motor current signal exceeds the limit set by the current adjustment signal.

In accordance with yet another example of the present invention, the unit is designed to operate with a variable input voltage signal with a range between zero volts and five volts.

A further example of the present invention generates a current adjustment signal between zero volts and 4 volts.

A still further example of the present invention provides a method for adjustment of over-current protection which includes providing an integrated circuit chip which selectively outputs a pulse-width modulation motor control signal in proportion to a variable input voltage signal, a ground signal and a current adjustment signal, providing the adjustable input voltage signal and ground signal, and generating the current adjustment signal in proportion to the difference between the input voltage signal and the ground signal.

A still further example of the present invention utilizes a voltage divider that is formed from first and second resistor which are connected in series between the input voltage signal and the ground signal.

Yet another example of the present invention provides a method for an improved protection circuit for a motor which includes providing a motor control signal which controls the amount of power that will be supplied to the motor, providing a variable input voltage, monitoring the amount of power that is supplied to the motor, and deriving a motor power limit from the variable input voltage using a voltage divider in order to reduce the motor control signal and control the amount of power supplied to the motor when the amount of power exceeds the motor power limit.

An additional example of the present invention utilizes a voltage divider which provides a power limiting signal in proportion to a power supply signal.

Other objects and further scope of the applicability of the present invention will become apparent from the detailed description to follow, taken in conjunction with the accompanying drawings wherein like parts are designated by like reference numerals.

DESCRIPTION OF THE PREFERRED EMBODIMENTS

The present invention provides a new limiting signal circuit configuration for the connection of a pulse-width modulation motor controller integrated circuit. This new circuit allows for increased control over the over-current protection scheme. The invention utilizes a resistor based voltage divider connected to a variable input voltage source to provide a sliding scale current limiting signal in proportion to the input voltage. This method provides improved protection in relationship to the incoming power signal.

Figure 1:
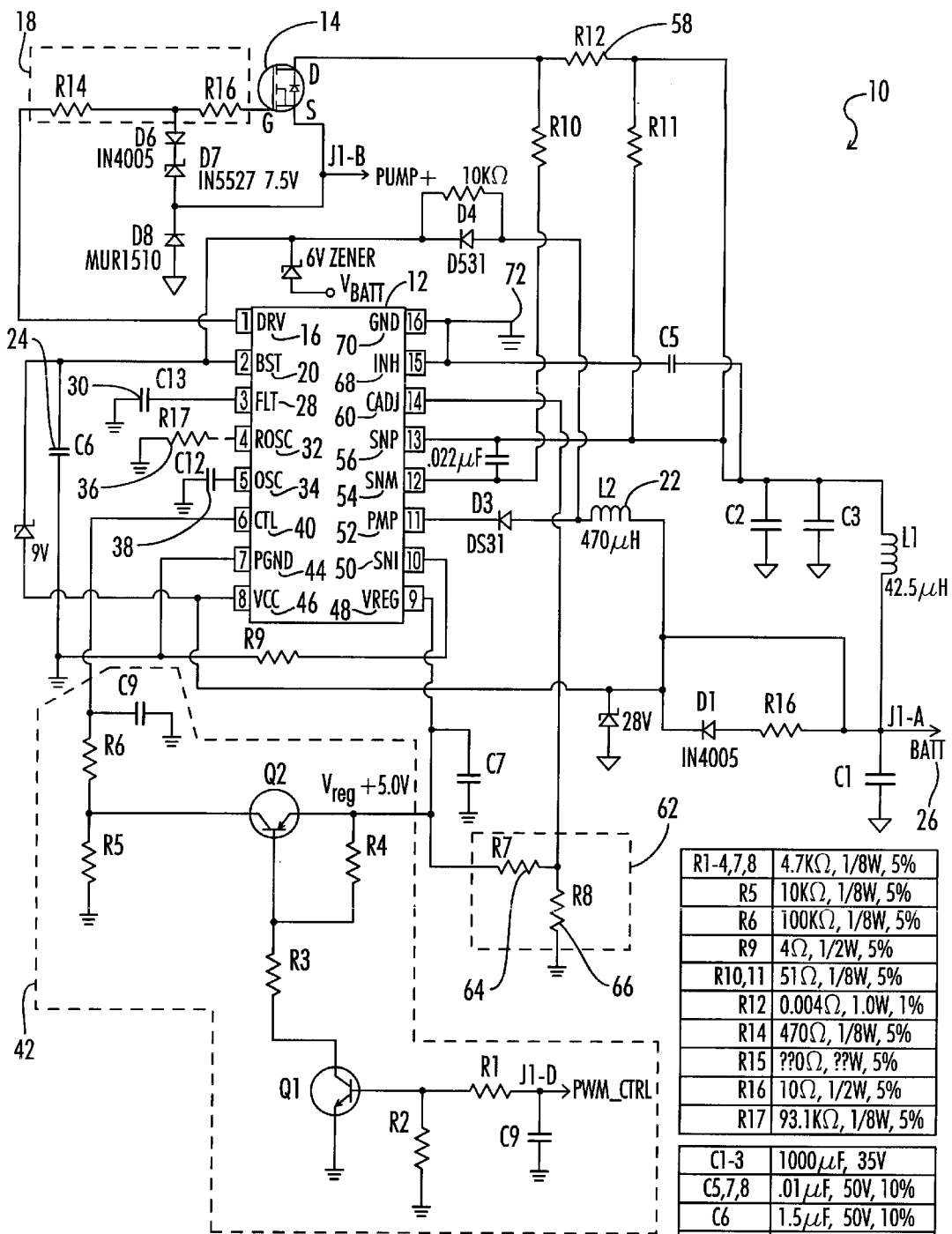
FIG. 1 is a typical prior art application diagram schematic for a pulse-width modulation motor controller utilizing an integrated circuit chip.
Figure 2:
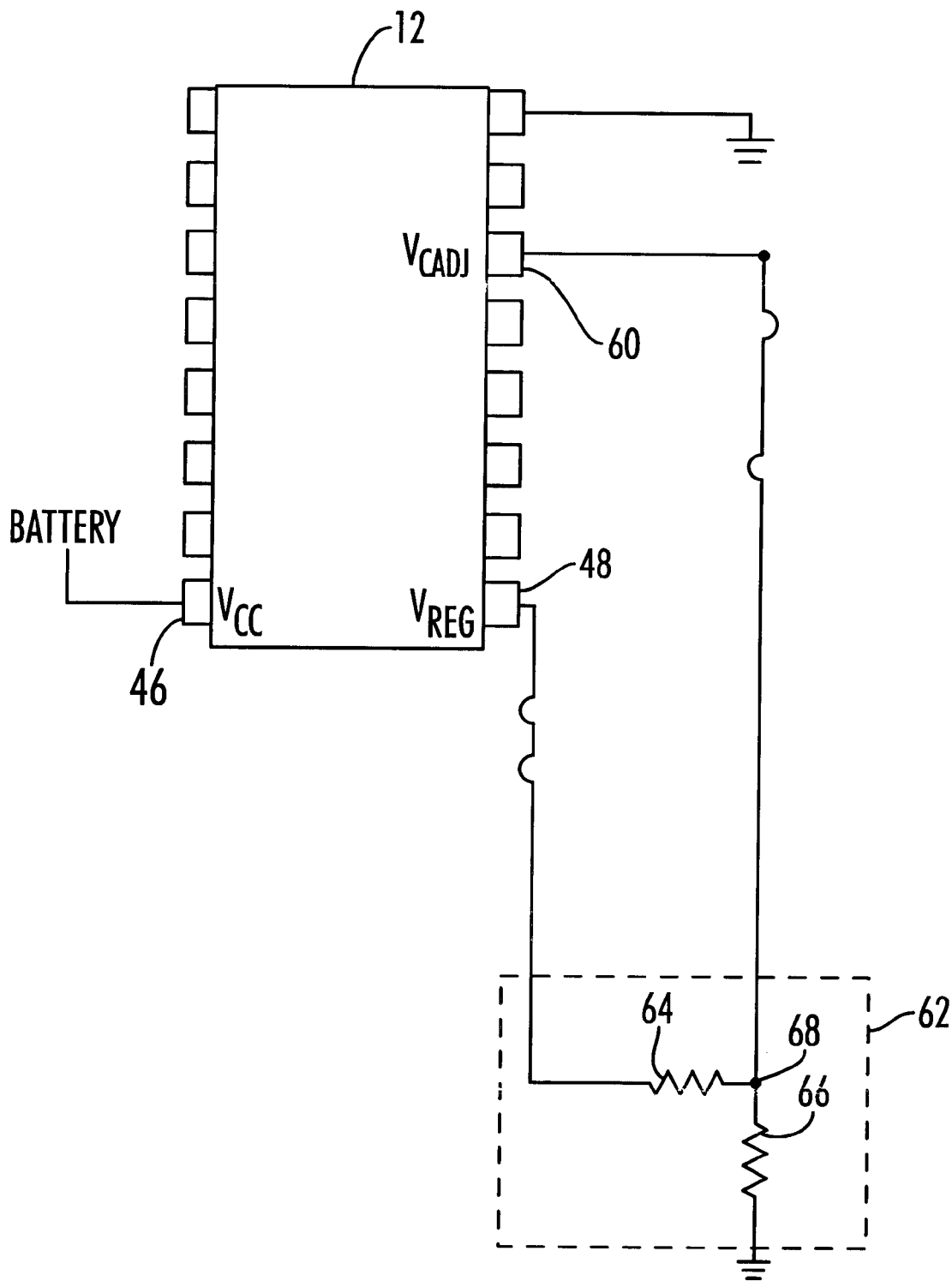
FIG. 2 is a subset of the prior art electrical schematic of FIG. 1.

The present invention uses a majority of the schematic of FIG. 1 for implementing the pulse-width modulation motor controller. The present invention is directed to a change in the input to pin 60 of the integrated circuit 12 shown in FIG. 1. The change is made by utilizing a new variable voltage input and modifying the voltage divider 62 and its internal resistors 64 and 66. The variable voltage input powers both the CTL pin 40 and the VCADJ pin 60. As previously noted, when the voltage at the CTL pin is less than 10% of Vreg, the integrated circuit 12 enters a quiescent mode of operation. Since VREG is a a regulated five volts, then the chip 12 becomes quiescent when VIN measures less than 0.5 volts. When VIN is above 0.5 volts, then the chip 12 remains active. This invention uses the voltage range above the 0.5 volt level to control the signal at the VCADJ pin 60.

Figure 3:
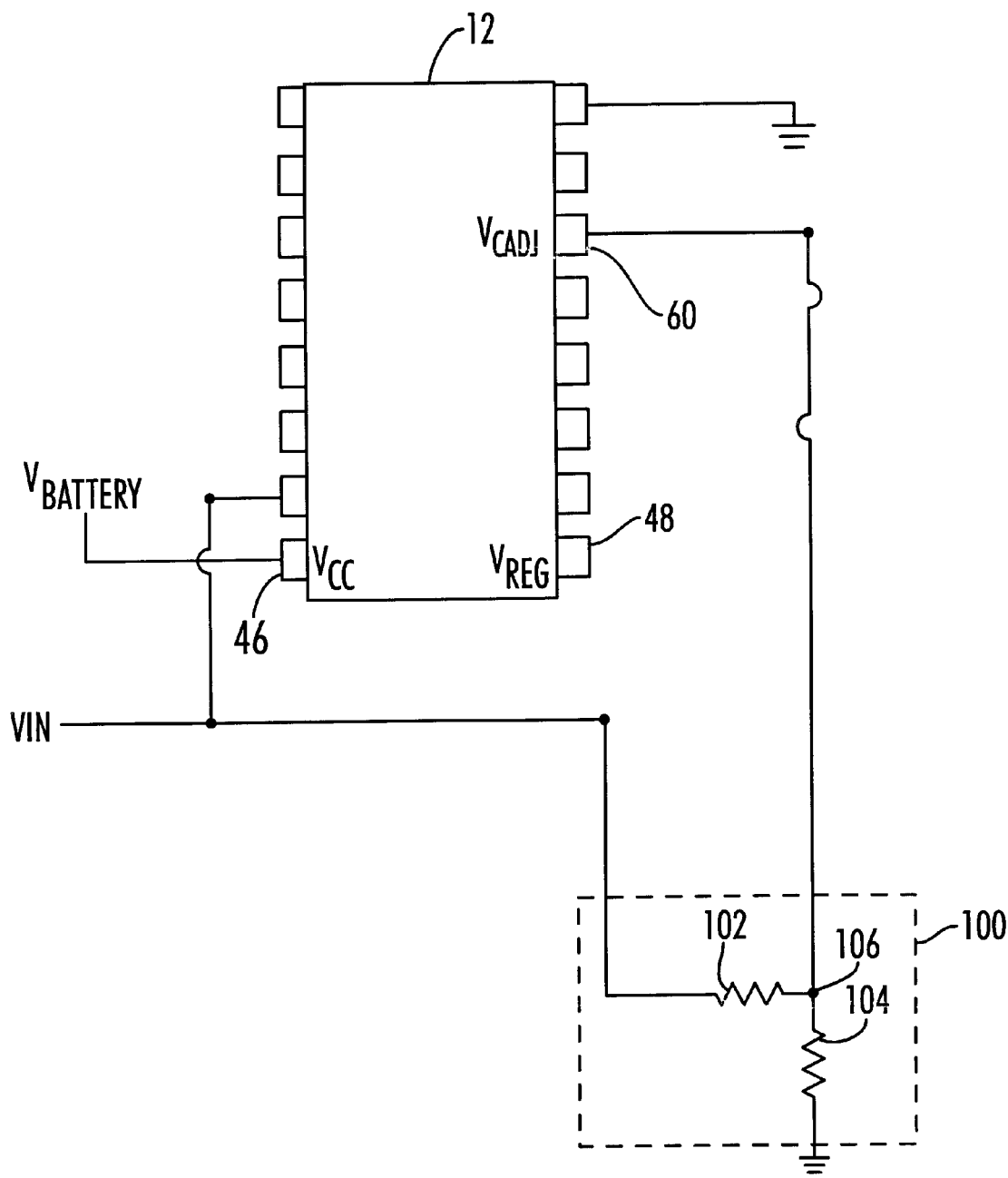
FIG. 3 is a schematic representation of the new connection method for the subset of the electrical schematic shown in FIG. 2.
Figure 4:
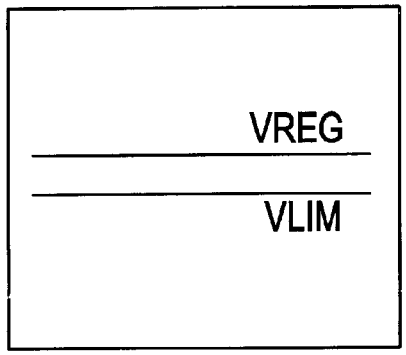
FIG. 4 is a schematic representation of the prior art voltage limiting signal shown in comparison to the voltage regulation signal.
Figure 5:
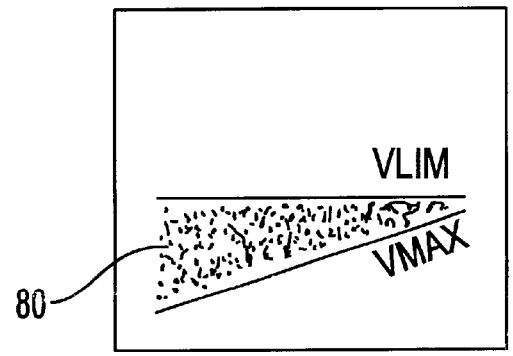
FIG. 5 of the drawings is a schematic representation of the voltage limiting signal compared against the maximum normal motor voltage.

FIG. 3 of the drawings shows the improved connection method for the current adjustment signal into pin 60 of the integrated circuit 12. This improved connection method uses a voltage divider 100 which is shown by resistors 102 and 104 with an output into the current adjustment pin 60. This method differs over the prior art because the input voltage for the voltage divider formed from resistors 102 and 104 is from the variable input voltage VIN. The variable input voltage VIN enables the operation of the circuit at the CTL pin once it exceeds the 10% threshold, and then may be utilized to control the current adjustment signal. This method of connection allows for the voltage at the current adjustment signal pin 60 to vary with the varying input voltages supplied by the signal VIN.

Figure 6:
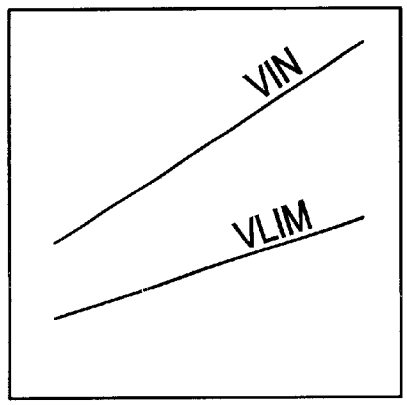
FIG. 6 of the drawings is a schematic representation of the new voltage limiting signal compared against the variable input voltage.

FIG. 6 of the drawings shows the result of the new connection method as shown in FIG. 3 of the drawings. As shown in FIG. 6, as the variable input voltage VIN increases, the new connection method allows for a new adjustable voltage limiting signal VADJ to rise proportionally to the variable input signal VIN. Thus, the VADJ may differ from the voltage regulation signal VREG as the VADJ varies with the VIN signal.

Figure 7:
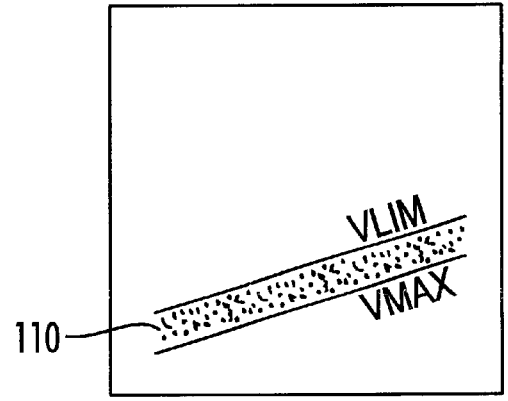
FIG. 7 of the drawings is a schematic representation of the voltage limiting signal controllably adjusted to remain above the maximum normal motor voltage.

As shown by FIG. 7 of the drawings, by varying the VIN signal with the power supplied to motor, the adjustable voltage limiting signal VADJ may provide a much closer coordination to the available output power VMAX. The closer coordination of the VMAX and the VADJ signal results in improvements to the available protection as shown by the reduced area 110 when compared against the prior art area 80. Because the signal VADJ rises in proportion to the input voltage signal VIN, the motor protection level is not limited to a single output level but is allowed to track the protection level and increase or decrease according to the input voltage VIN.

The invention may be implemented in a typical application diagram shown in FIG. 1 of the drawings by changing the input to the voltage divider 62 to a new variable input signal VIN instead of the V regulation signal off of pin 48. When this change is made, the value of the resistors 64 and 66 will have to be changed in order to maintain the proper input voltage for the current adjustment signal at pin 60. Thus, it becomes important to consider the minimum and maximum VIN signals that will be input to the device in order to maintain proper current adjustment signal at pin 60.

Voltage divider 100 may be substituted for prior art voltage divider 62 to upgrade existing systems.

The over-current protection circuit for a pulse-width modulation motor controller uses a variable input voltage signal, a ground signal, a motor current signal, and a current adjustment signal as inputs to an integrated circuit chip 12. This integrated circuit chip 12 will selectively output a pulse-width modulation motor control signal in proportion to the variable voltage signal, the ground signal, the current adjustment signal, and the motor current signal. This system provides an improvement by utilizing a first resistor 102 and second resistor 104 in a voltage dividing circuit The first resistor 102 connects the variable input voltage signal to the current adjustment signal, and the second resistor 104 connects the current adjustment signal to the ground signal. This creates a current adjustment signal which is in proportion to the variable input voltage signal.

In this manner, the integrated circuit chip 12 can clip or otherwise control the pulse-width modulation motor control signal whenever the motor current signal exceeds the current adjustment signal.

The first resistor 102 and second resistor 104 should be proportioned to set the current adjustment signal between 0 volts and 5 volts, or as otherwise appropriate for the design of the integrated chip 12 being used.

This invention provides a method for adjusting the over-current protection of an integrated circuit 12 for the pulse-width modulation of a motor. This method includes providing an integrated circuit chip 12 which selectively outputs a pulse-width modulation motor control signal that is in proportion to a variable input voltage signal, a ground signal and a current adjustment signal. By providing an input adjustment voltage signal and a ground signal, the current adjustment signal may be generated by using a voltage divider 100 to find a proportional difference between the adjustable input voltage signal and the ground signal. This voltage divider 100 may be formed by a first resistor 102 and second resistor 104 which are connected in series and pulling the current adjustment signal off of the attachment connection point 106 between the first resistor 102 and second resistor 104.

This circuitry also provides a method for improved protection by providing a new way to generate a motor controlling signal which controls the amount of power supplied to a motor. In a system with a variable input voltage, the amount of power supplied to the motor may be monitored in order to vary the motor control signal. This motor control signal is used to control the amount of power supplied to the motor. The upper motor power limit for the motor control signal should be derived from the variable input voltage signal utilizing a voltage divider 100. By comparing the motor power limit with the actual amount of power being supplied to the motor, the motor control signal can be reduced when the amount of supplied power exceeds the motor power limit.

Another alternative embodiment of the present invention provides an improved protection circuit for a motor controller which includes a variable power supply signal and a voltage divider which divides the variable power supply signal into a power limiting signal in proportion to the power supply signal. An additional motor power signal input is used as feedback into an integrated circuit chip which generates a motor control signal. This integrated circuit chip monitors the power limiting signal and the motor power signal in order to reduce the motor control signal when the power limiting signal exceeds the motor power signal.

Thus, this system provides an improved apparatus for generating a motor limiting signal for a pulse width modulation motor control circuit utilizing an integrated circuit 12 which accepts a variable input voltage signal, a ground signal, and a motor limiting signal. The improvement utilizes a voltage divider 100 for generating the motor limiting signal in proportion to the variable input voltage signal.

Thus, one of the preferred embodiments of this invention provides an improved apparatus for generating a motor limiting signal for a pulse-width modulation motor control circuit which utilizes an integrated circuit chip 12 which accepts and input voltage signal, a ground signal, and a motor limiting signal. The improvement of this circuit is the use of a voltage divider means 100 for generating a motor liming signal, which is in proportion to the input voltage signal. This voltage divider means 100 is comprised of a first resistor 102 which is connected to the input voltage signal and an attachment point 106, and a second resistor 104 which is connected to the attachment point 106 and the ground signal. The motor limiting signal is taken off of the attachment point 106 and supplied to the integrated circuit chip 12. The voltage divider 100 should be designed so that the first resistor 102 and second resistor 104 maintain a voltage level at the attachment point 106 in proportion to the input voltage signal. In addition, this voltage level should be maintained for the appropriate input to the integrated circuit 12. Normal operating parameters for this type of integrated circuit are inputs ranges from 0 volts to 5 volts. The present embodiment has described the current adjustment signal that is input to the integrated circuit 12 as a voltage signal, however, alternative embodiments of this invention may use current signals or other appropriate signals in order to implement the present invention.

Thus, although there have been described particular embodiments of the present invention of a new and useful Apparatus and Method for Improved Current Protection for a Motor Controller, it is not intended that such references be construed as limitations upon the scope of this invention except as set forth in the following claims.

What is claimed is:

1. An improved over-current protection circuit for a pulse width modulation motor controller, comprising:

a variable input voltage signal;

a ground signal;

a pulse width modulation motor control signal;

a motor current signal;

a current adjustment signal which sets a limit for said motor current signal;

an integrated circuit chip which selectively outputs said pulse width modulation motor control signal in proportion to said variable input voltage signal, said ground signal, said current adjustment signal and said motor current signal;

a first resistor, wherein said first resistor connects said variable input voltage signal and said current adjustment signal; and a second resistor, wherein said second resistor connects said current adjustment signal and said ground signal, whereby said first resistor and said second resistor control said current adjustment signal in proportion to said variable input voltage signal.

2. Said over-current protection circuit of claim 1, wherein:

said integrated circuit chip clips said pulse width modulation motor control signal whenever said motor current signal exceeds said limit.

3. Said over-current protection circuit of claim 1 wherein:
said variable input voltage signal includes a range between zero and 5 volts.

4. Said over-current protection circuit of claim 1, wherein:
said current adjustment signal is between zero and 4 volts.

5. Said over-current protection circuit of claim 1, wherein:
said integrated circuit chip is a DELCO ELECTRONICS CORPORATION 16214712.

6. Said over-current protection circuit of claim 1, wherein:
said first resistor and said second resistor are proportioned to set said current adjustment signal between 1 and 4 volts for a range of variable input voltage signal.

7. A method for adjustable over-current protection, comprising:
connecting an adjustable input voltage signal and a reference signal to an integrated circuit which selectively outputs a pulse width modulation motor control signal in proportion to the adjustable input voltage signal, the reference signal, and a current adjustment signal; and
generating said current adjustment signal in proportion to a difference between said adjustable input voltage signal and said reference signal.

8. Said method of claim 7, wherein:
said generating is performed by a voltage divider.

9. Said method of claim 8, wherein:
said voltage divider is formed from a first and second resistor connected in series.

10. A method for an improved protection circuit for a motor, comprising:
receiving a variable input voltage at a motor controller;
generating at the motor controller a motor control signal which controls an amount of power supplied to said motor;
monitoring said amount of power supplied to said motor;
deriving a motor power limit from said variable input voltage using a voltage divider;
monitoring the motor power limit at the motor controller and
changing said motor control signal to reduce said amount of power supplied to said motor when said amount of power exceeds said motor power limit.

11. An improved protection circuit for a motor controller, comprising:
a variable power supply signal;
a voltage divider which provides a power limiting signal in proportion to said power supply signal;
a motor power signal; and
an integrated circuit chip which outputs a motor control signal when said power limiting signal exceeds said motor power signal.

12. An improved apparatus for generating a motor limiting signal for a pulse width modulation motor control circuit utilizing an integrated circuit which accepts an input voltage signal, a ground signal, and a motor limiting signal, said improvement comprising:
a voltage divider means for generating said motor limiting signal in proportion to said input voltage signal.

13. Said improved apparatus of claim 12, wherein said voltage divider means includes:
a first resistor connected to said input voltage signal and an attachment point; and
a second resistor connected to said attachment point and said ground signal.

14. Said improved apparatus of claim 13, wherein:
said first resistor and said second resistor maintain a voltage level at said attachment point in proportion to said input voltage signal.

15. Said improved apparatus of claim 14, wherein:
said voltage level is maintained between zero and five volts.

16. Said improved apparatus of claim 12, wherein:
said motor limiting signal includes a voltage signal.

17. Said improved apparatus of claim 16, wherein:
said voltage signal includes voltages between zero volts and five volts.

* * * * *